United States Patent [19]

Amidon

[11] 4,017,581

[45] Apr. 12, 1977

[54] PROCESS FOR PREPARING RELIEF PRINTING MASTERS AND MOLDS

[75] Inventor: Alan B. Amidon, Penfield, N.Y.

[73] Assignee: Xerox Corporation, Stamford, Conn.

[22] Filed: Mar. 25, 1975

[21] Appl. No.: 561,824

[52] U.S. Cl. ............................ 264/220; 101/401.1; 156/234; 156/235; 156/238; 156/241; 156/254; 156/298; 264/163; 264/259

[51] Int. Cl.² ...................... B29C 1/02; B32B 31/18

[58] Field of Search .......... 264/219, 227, 225, 226, 264/221, 163; 156/241, 234, 254, 269, 268; 101/401.1

[56] References Cited

UNITED STATES PATENTS

| | | | |
|---|---|---|---|
| 3,141,407 | 7/1964 | Leeds | 264/226 |
| 3,379,813 | 4/1968 | Amstin | 264/227 |
| 3,428,725 | 2/1969 | Delmonte | 264/226 |
| 3,485,696 | 12/1969 | Hammonds | 101/401.1 |
| 3,741,787 | 6/1973 | Tordjman | 156/234 |
| 3,792,147 | 2/1974 | Wohforth et al. | 264/225 |

FOREIGN PATENTS OR APPLICATIONS

| | | | |
|---|---|---|---|
| 2,154,682 | 10/1972 | Germany | 156/234 |

*Primary Examiner*—James B. Lowe
*Attorney, Agent, or Firm*—James J. Ralabate; James P. O'Sullivan; Donald M. MacKay

[57] ABSTRACT

A process for preparing a mold for relief printing masters, said mold having an adhesive silicone surface, is provided comprising depositing a particulate material in image configuration on a suitable substrate, contacting said substrate with a second member comprising a substrate with an adhesive coating of a silicone gum curable to an adhesive elastomeric condition such that the adhesive gum is in contact with the image material, separating the members whereby the silicone layer splits in the nonimaged areas and is prevented from splitting by the transfer of the particulate image material to the second member in the image areas, and curing the silicone gum on the first member to an adhesive elastomeric condition to provide a mold for printing masters. The process for preparing the printing master comprises the additional steps of filling the submerged portions of said mold with a liquid but hardenable material suitable for master imaging, contacting said liquid with a suitable master substrate, hardening the liquid material and removing the resultant printing master.

10 Claims, 2 Drawing Figures

PROCESS FOR PREPARING RELIEF PRINTING MASTERS AND MOLDS

BACKGROUND OF THE INVENTION

Relief image printing masters are employed for high quality printing which generally require expensive or timeconsuming methods of preparation. A preferred type of printing masters are the rubber plates which can be formed by the use of molds, by the use of cutting and engraving of rubber blocks or by means of photoengraving. Photoengraving, which is one of the most widely used original pictorial image carrier methods for relief printing, can be divided into six main stages: (1) photography, (2) photomechanics, (3) etching, (4) finishing, (5) routing and blocking and (6) proofing.

This invention is directed to a means for more simply preparing printing masters having relief images which are also of high quality.

BRIEF DESCRIPTION OF THE INVENTION

It has now been discovered that printing masters having a relief image of high quality can be formed by a simple and inexpensive method. More particularly, the process for preparing the printing master broadly comprises forming a relief mold having abhesive surface areas, filling the mold with a liquid but hardenable material, placing a suitable master substrate in contact with the liquid material, hardening the material and removing the resultant relief master from the mold. The process for preparing the relief mold broadly comprises providing a suitable substrate, depositing a particulate material in image configuration on said substrate, providing a second substrate, coating said second substrate with an adhesive silicone gum curable to an abhesive elastomeric condition, contacting said substrates such that the adhesive is in contact with the image material, separating the members whereby the adhesive splits in the nonimaged areas and is prevented from splitting by the transfer of the particulate material to the second member thereby leaving image depressions in the first member and curing the silicone gum on the first member to an elastomeric abhesive condition. Moreover, masters can be formed of any desirable relief from an essentially planographic image by regulating the thickness of the adhesive gum as the gum tends to split essentially in the middle.

DETAILED DESCRIPTION OF THE INVENTION

Figure 1:
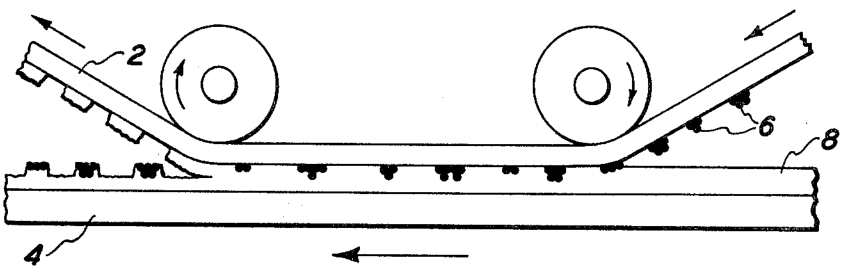
FIG. 1 is a schematic illustration of the method for preparing the printing master mold in which an imaged substrate is rolled in contact with the adhesive gum coated substrate, the members separated to obtain the splitting of the adhesive layer and form the image depressions.

Reference is made to FIG. 1 in which the method for preparing the printing master mold is illustrated. Substrates 2 and 4 ae conventional self-supporting materials to which the silicone gum can be adhered and which possess sufficient heat and mechanical stability to permit use under widely varying conditions. The adhesive silicone gum layer is shown as 8. Particulate image material 6 is shown in contact with substrate 2 in the easterly most portion of the drawing but when the substrates ae separated in the westerly most portion, the particulate imaging material 6 is transferred to a silicone gum coated substrate 4.

Figure 2:
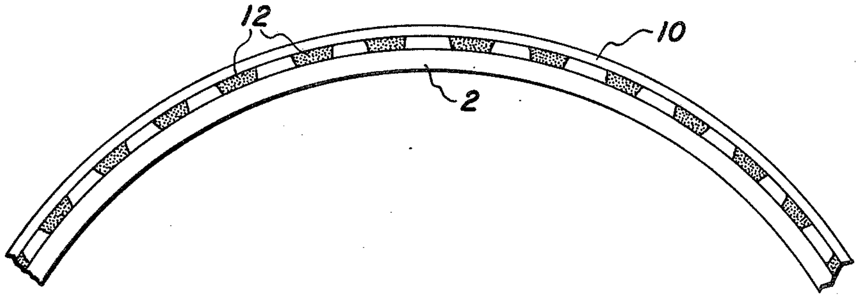
FIG. 2 is a schematic illustration of the process for preparing the master in which the mold filled with a suitable image material is shown in contact with the printing master substrate.

In FIG. 2 the master preparation is illustrated were substrate 2 of the mold structure has depressions 12 which are coated with a liquid but hardenable image material in contact with master substrate 10. The liqud is hardened and the substrates separated to obtain the relief imaged master.

Typical substrates for use in the invention for either the mold structure or master substrate include materials such as paper, metals such as aluminum and plastics such as polyester, polycarbonate, polysulfone, nylon and polyurethane.

Suitable silicones for use in the invention are silicone homopolymers or copolymers which are capable of being cured to an abhesive condition. Exemplary of suitable silicone gums are those having only methyl containing groups in the polymer chain such as polydimethylsiloxane; gums having both methyl and phenyl containing groups in the polymer chain as well as gums having both methyl and vinyl groups, methyl and fluorine groups or methyl, phenyl and vinyl groups in the polymer chain.

Silicone copolymers, heterophase polymers or polymer blends can be employed in which a nonsilicone phase is present. Typical nonsilicone polymer phases which can be employed include styrene polymers such as polystyrene and poly($\alpha$-methyl-styrene); polyesters, polyamides, acrylics, vinylpolymers and polyurethanes. Other conventional organic polymers can also be employed. The ratio of materials employed in the copolymers will depend upon the particular polymers employed but generally a silicone component should comprise from between about 50 and about 100 parts by weight of the total polymer and from between about 50 and about 0 parts nonsilicone component by weight of the total polymer. Particulary preferred copolymers have a silicone base of an organopolysiloxane with a polystyrene or poly($\alpha$-methylstyrene) phase. Copolymers of this type and methods for their preparation are described in *I & EC Product Research and Development*, Vol. 10, p. 10, (March 1971) and *Macromolecules*, Vol. 3, p. 1, (January - February 1970).

The thickness of the silicone gum layers will depend on the material, the heighth of image desired and other variables. Generally however, the silicone gum will be applied to a thickness of between about 1/2 mil and about 100 mils, and preferably about 1 and about 50 mils.

The particulate image material can be any of a number of organic thermoplastic polymers as well as inorganic materials such as salt or glass beads. Typical thermoplastic polymers are those employed as "toners" in the art of electrophotographic development and include styrene copolymers such as styrene/n-butyl methacrylate, styrene/butadiene, as well as vinyl polymers such as poly(vinylchloride), and olefins such as polyethylene. The particular imaging material employed is not a critical part of the invention and other materials will be readily apparent to one of ordinary skill in the art.

Liquid but hardenable materials which can be employed to form the image of the master are rubbers such as styrene-butadiene rubber, polyurethanes, silicone rubbers, natural rubbers, and other conventional materials which have previously been employed to form relief images. Preferably the image is formed of a material which is resilient when hardened so as to permit use of the master in direct printing in which no off-set blanket roller is employed.

The silicone gums can be applied to the substrate by conventional means such as draw bar coating, spray or by dipping the substrate in the silicone gum. Similarly, the silicones can be cured by conventional means such as by catalysts supplied by the manufacture of the gums, by heat or by light.

In forming a master from the mold of the invention the valleys can be filled with a liquid but hardenable material and the lands cleared by use of a doctor blade or the like. A suitable substrate can then be placed on the mold to which the liquid material will adhere, and the liquid hardened by heat, light or the like, the particular means depending upon the material employed and its curing or hardening mechanism. Before filling the valleys of the mold, it is preferable to coat said valleys with a silicone oil or release fluid so as to permit easy removal of the hardened image from the mold. Otherwise it may be necessary to employ a pick or rely on the different materials thermal coefficient of expansion. After the master is removed from the mold it can be employed on a conventional offset or direct printing press, depending on the type of image formed, employing conventional inks, dampening solutions, and paper materials.

The following examples serve to illustrate the invention and preferred embodiments thereof. All parts and percentages in said example and elsewhere in the specification and claims are by weight unless otherwise specified.

EXAMPLE I

One hundred grams of a 20 weight percent solution of polydimethylsiloxane silicone gum (union Carbide Y-3557) in benzene (which has 0.5 weight percent of aminobutylmethylsiloxane copolymer units and a molecular weight from 200,000 to 500,000) is added to 2 grams of poly($\alpha$-methylstyrene) to provide a weight ratio of 90 percent silicone gum to 10 percent styrene polymer. The solution was pour coated onto an aluminum sheet to a thickness of 100 microns and the composite dried at ambient temperature for about 2 hours to evaporate the benzene solvent and render the copolymer tacky to the touch.

Employing a Xerox Model D Processor an electrostatic latent image was formed and developed with an electrophotographic toner (Xerox 2400). The developed image which was formed and developed on the selenium plate of the Model D copier was electrostatically transferred to a sheet of paper and the two substrates pressed together in adhesive contact. The two substrates were then hand separated whereupon the silicone splits and the particulate image material was transferred to the second substrate to provide a first substrate of depressed image areas. The resultant mold was placed in an air oven at 185° C. for onehalf hour to cure the silicone and allowed to cool to room temperature.

The silicone mold was spray coated in the imaged areas with a polydimethylsiloxane oil and the resultant coated valleys filled with a liquid polyurethane. A master substrate of aluminum was placed on the mold in contact with the liquid material and the composite heated at 250° F to harden the liquid material. The resultant master was separated from the mold, selectively inked and excellent prints obtained therefrom.

Having described the present invention with reference to these specific embodiments, it is to be understood that numerous variations can be made without departing from the spirit of the invention and it is intended to encompass such reasonable variations or equivalents within its scope.

I claim:

1. A method for preparing an adhesive mold for making printing masters comprising providing a suitable first substrate, depositing a particulate material in image configuration on said first substrate, coating a second substrate with a tacky adhesive silicone gum curable to an adhesive elastomeric condition, contacting said substrates such that the adhesive is in contact with the image bearing substrate in the nonimaged areas and is in contact with the particulate material in the imaged areas, separating said substrates whereby the silicone splits in the nonimaged areas and is prevented from splitting by the transfer of the particulate image material in the imaged areas, and whereby the image material is transferred from the first substrate to the second substrate and curing the silicone gum remaining on the first substrate to an elastomeric condition to provide a mold for relief printing masters.

2. The method of claim 1 wherein the adhesive gum is applied to a thickness between about 1 and about 50 microns.

3. The method of claim 1 wherein the adhesive gum is a blend of polydimethylsiloxane and polystyrene or poly($\alpha$-methylstyrene).

4. The method of claim 1 wherein the adhesive gum is a blend of polydimethylsiloxane and poly($\alpha$-methylstyrene).

5. A method for preparing a printing master comprising:

a. providing a suitable first substrate,
b. depositing a particulate material in image configuration on said first substrate,
c. providing a second substrate,
d. coating said second substrate with a tacky adhesive silicone gum curable to an adhesive elastomeric condition,
e. contacting said coated substrates such that the adhesive is in contact with the image bearing substrate in the nonimaged areas and is in contact with the particulate material in the imaged areas,
f. separating said substrates whereby the silicone splits in the nonimaged areas and is prevented from splitting by the transfer of the particulate image material in the imaged areas, and whereby the image material is transferred from the first substrate to the second substrate,
g. curing the silicone gum remaining on the first substrate to an elastomeric condition to provide a mold for relief printing masters,
h. filling the resultant submerged portions of said mold with a liquid but hardenable material suitable for forming a master image,
i. affixing a suitable master substrate to said liquid material,
j. hardening the liquid material and removing the resultant replica from the mold.

6. The method of claim 5 wherein the liquid material is a polyurethane.

7. The method of claim 5 wherein the valleys of the mold are coated with a release fluid prior to filling with the liquid but hardenable material.

8. The method of claim 5 wherein the adhesive gum is applied to a thickness between about 1 and about 50 microns.

9. The method of claim 5 wherein the adhesive gum is a blend of polydimethylsiloxane and polystyrene or poly($\alpha$-methylstyrene).

10. The method of claim 5 wherein the adhesive gum is a blend of polydimethylsiloxane and poly($\alpha$-methylstyrene).

* * * * *

UNITED STATES PATENT AND TRADEMARK OFFICE

CERTIFICATE OF CORRECTION

PATENT NO. : 4,017,581

DATED : April 12, 1977

INVENTOR(S) : Alan B. Amidon

It is certified that error appears in the above-identified patent and that said Letters Patent are hereby corrected as shown below:

In Claim 5, column 4, line 44, "adhesive" should be --abhesive--.

Signed and Sealed this

Twenty-eighth Day of June 1977

[SEAL]

*Attest:*

RUTH C. MASON
*Attesting Officer*

C. MARSHALL DANN
*Commissioner of Patents and Trademarks*